(12) United States Patent
Marquardt et al.

(10) Patent No.: US 7,350,839 B2
(45) Date of Patent: Apr. 1, 2008

(54) HAND TOOL

(75) Inventors: Elizabeth J. Marquardt, Poynette, WI (US); Paul R. Johnson, Hastings, MN (US); Anthony W. Konkler, Lodi, WI (US); Nathan B. Fethke, North Liberty, IA (US)

(73) Assignee: Fiskars Brands, Inc., Madison, WI (US)

( * ) Notice: Subject to any disclaimer, the term of this patent is extended or adjusted under 35 U.S.C. 154(b) by 135 days.

(21) Appl. No.: 10/513,902

(22) PCT Filed: May 9, 2003

(86) PCT No.: PCT/US03/14512

§ 371 (c)(1),
(2), (4) Date: Nov. 14, 2005

(87) PCT Pub. No.: WO03/096783

PCT Pub. Date: Nov. 27, 2003

(65) Prior Publication Data

US 2006/0097530 A1    May 11, 2006

Related U.S. Application Data

(60) Provisional application No. 60/380,361, filed on May 14, 2002.

(51) Int. Cl.
*A01B 1/22* (2006.01)
(52) U.S. Cl. .......................... 294/60; 294/57
(58) Field of Classification Search ................. 294/49, 294/55, 57, 60; 76/111, 113
See application file for complete search history.

(56) References Cited

U.S. PATENT DOCUMENTS

| 1,223,555 | A |   | 4/1917 | Benton |
|---|---|---|---|---|
| 1,423,775 | A |   | 7/1922 | Mundt |
| 1,513,179 | A |   | 10/1924 | Monica |
| 3,767,249 | A |   | 10/1973 | Rogers |
| 4,655,494 | A |   | 4/1987 | Eads et al. |
| 4,718,708 | A | * | 1/1988 | Zacuto .......................... 294/57 |
| 5,421,931 | A |   | 6/1995 | Carmien |
| 5,503,445 | A |   | 4/1996 | Fontaine |
| 5,660,421 | A |   | 8/1997 | Krenzler |
| 5,720,081 | A |   | 2/1998 | Aquilina |
| 5,887,920 | A |   | 3/1999 | Perciful |
| 6,131,972 | A |   | 10/2000 | Whitehead et al. |
| 6,338,511 | B1 | * | 1/2002 | Douglas et al. ................ 294/49 |
| D487,010 | S |   | 2/2004 | Marquardt et al. |
| D488,046 | S |   | 4/2004 | Marquardt et al. |

\* cited by examiner

*Primary Examiner*—Dean J Kramer
(74) *Attorney, Agent, or Firm*—Foley & Lardner LLP

(57) ABSTRACT

An improved hand tool is disclosed having an elongated handle member (40) coupled to a tool head (20) and includes a junction (60) between the handle member and a surface of the tool head that defines an elongated interface. A weld (36) is provided along substantially all of the elongated interface so that the tool head is rigidly attached to a lower end of the handle member. A gripping member (80) is coupled to an upper end of the handle member and has a top portion (88) with an arcuate profile coupled to a bottom portion (90) having a substantially U-shaped profile. The tool head includes a blade member formed of a material having a first thickness and integrally formed with a step member having a second thickness greater than the first thickness.

17 Claims, 12 Drawing Sheets

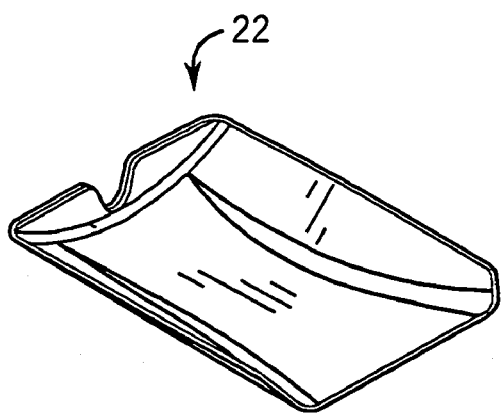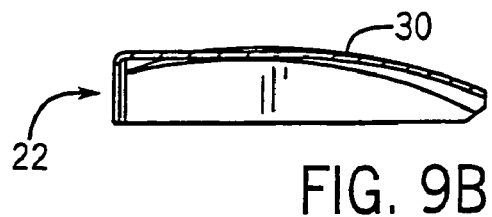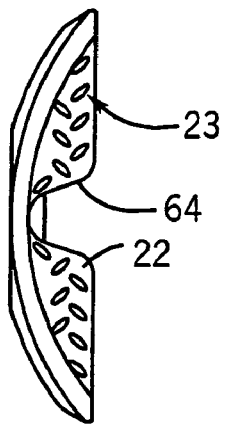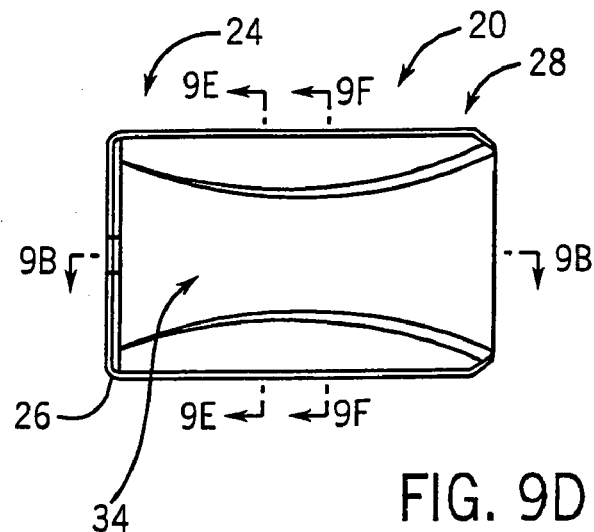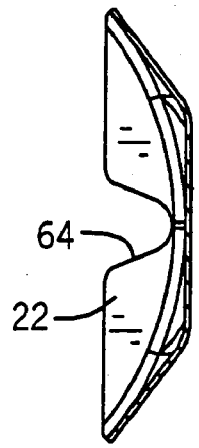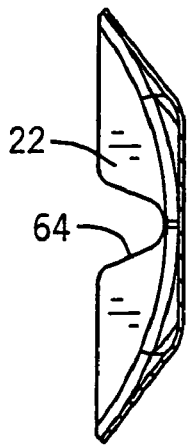
FIG. 9A
FIG. 9B
FIG. 9C
FIG. 9D
FIG. 9E
FIG. 9F

US 7,350,839 B2

HAND TOOL

CROSS REFERENCE TO RELATED APPLICATIONS

The present application claims priority to U.S. Provisional Patent Application No. 60/380,361 titled "Improved Hand Tool" filed on May 14, 2002, the disclosure of which is incorporated by reference in its entirety.

FIELD OF THE INVENTION

The present invention relates to an improved hand tool. The present invention relates more particularly to an improved hand tool of a type that may be used in shoveling, gardening, cultivating, landscaping or digging operations.

BACKGROUND

It is well known to provide tools such as a hand tool having an elongated handle extension portion and a tool head portion for use in operations such as shoveling, digging, cultivating, etc. Such known hand tools include rakes, shovels, hoes, pitchforks, cultivators, etc. having a handle in the form of an elongated handle extension or shaft, or a gripping portion such as a transverse bar (e.g. T-shaped handle, D-ring handle, etc.). However, such known handle extension portions and gripping portions often have limited configurations in which a user may grasp them or are not readily adaptable to users of various heights, leading to discomfort or repetitive motion injuries. Such known hand tools also typically include a ledge or step on the top of the tool head that a user may step or stand on to obtain additional leverage or force in operating the hand tool. However, these known ledges or steps are often relatively narrow or thinly constructed and are often bent or deformed during such stepping or standing activities. Such known tool heads also typically include a coupling portion that joins the tool head to the handle, for example, an overlapping segment secured by fasteners (e.g. rivets, screws, bolts, etc.) or an extension of the tool head that is contoured into a socket for receiving a lower end of the handle, which may be secured by an interference fit or suitable fasteners. However, such coupling portions typically have a weak point at such coupling portions that tend to create common failure locations under heavy or repeated usage. Such known tool heads in the form of shovel blades also typically have a blade portion formed from a material having a generally uniform thickness and contoured into a desired shape. However, such known shovel blades typically have a weak point at a mid-portion or upper portion of the blade that may be deformed or damaged when the lower portion is firmly engaged and leverage is applied on the handle.

Accordingly, it would be advantageous to provide an improved hand tool having an ergonomically designed handle extension portion that has a shape resistant to deformation and is more readily adaptable to a broad variety of users. It would also be advantageous to provide an improved hand tool having an ergonomically designed gripping portion that is more readily adaptable to a broad variety of users. It would also be advantageous to provide an improved hand tool having a ledge or step that is more structurally robust and resistant to deformation. It would be further advantageous to provide an improved hand tool having a coupling portion that is more structurally robust and resistant to deformation. It would be also advantageous to provide an improved hand tool with a tool head in the form of a shovel blade that is more structurally robust and resistant to deformation.

Accordingly, it would be advantageous to provide an improved hand tool having any one or more of these or other advantageous features.

SUMMARY

The present invention relates to an improved hand tool having an elongated handle member coupled to a tool head and includes a junction between the elongated handle member and a surface of the tool head defining an elongated interface. A weld is provided along the elongated interface so that the tool head is rigidly attached to a lower end of the elongated handle member, and a gripping member coupled to an upper end of the elongated handle member and having a top portion that has a substantially arcuate profile coupled to a bottom portion having a substantially U-shaped profile.

The present invention also relates to an improved hand tool having a handle member coupled to a tool head and includes a junction between the handle member and a surface of the tool head defining an elongated interface. A weld is provided along substantially all of a perimeter of the elongated interface so that the tool head is rigidly attached to a lower end of the handle member.

The present invention further relates to an improved hand tool and includes a handle member having a cross-sectional shape that is substantially oblong. A tool head is securely attached to a first end of the handle member and a gripping member is provided at a second end of the handle member. The gripping member has a top portion with opposite ends defining an arc therebetween, where the opposite ends of the top portion are coupled to a bottom portion that has a substantially U-shaped profile to provide a structure configured for gripping by a user.

The present invention further relates to an improved hand tool having a handle member coupled to a tool head where the tool head includes a blade member and a step member. The blade member is formed of a material having a first thickness and is integrally formed with a step member having a second thickness that is greater than the first thickness. A plurality of treads are formed on the step member.

The present invention further relates to an improved hand tool having a handle member and a tool head attached to an end of the handle member. The tool head has a step end near the end of the handle member and a leading end opposite the step end. The tool head has a first thickness at the step end and the leading end, and has a second thickness that is greater than the first thickness at a location intermediate the step end and the leading end.

BRIEF DESCRIPTION OF THE DRAWINGS

FIGS. 9A through 9F are a schematic representation of a tool head portion of an improved hand tool according to a preferred embodiment.

DETAILED DESCRIPTION OF THE PREFERRED AND OTHER EXEMPLARY EMBODIMENTS

Figure 1A:
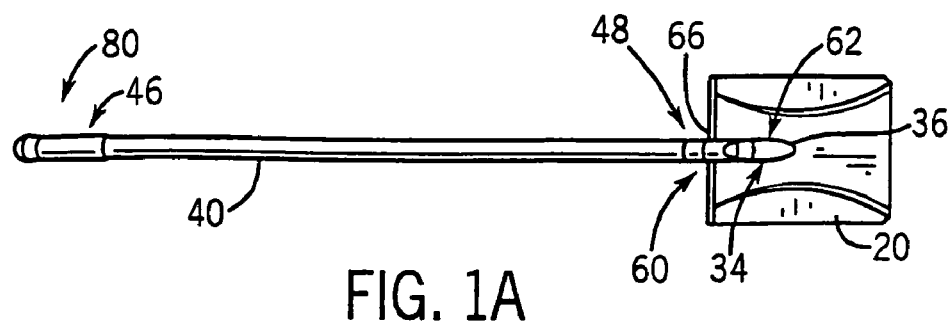
FIGS. 1A through 1C are a schematic representation of an improved hand tool according to a preferred embodiment.
Figure 1B:
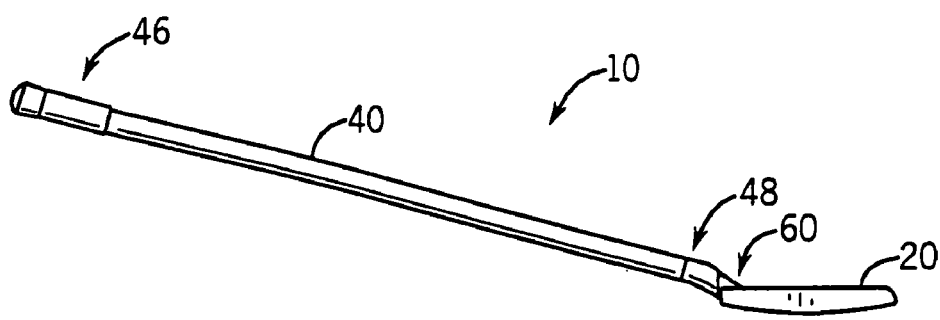
Figure 1C:
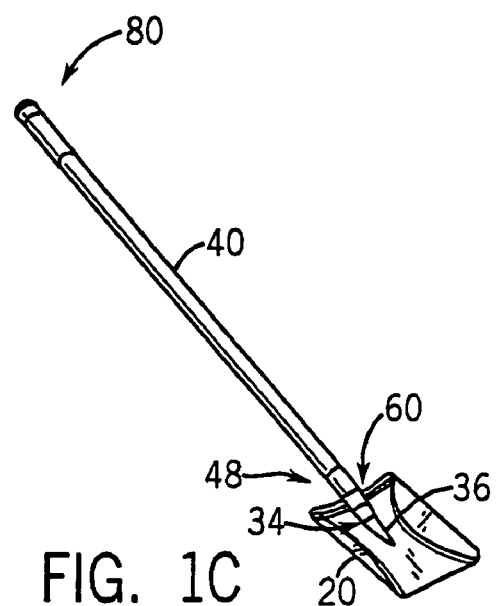
Figure 2A:
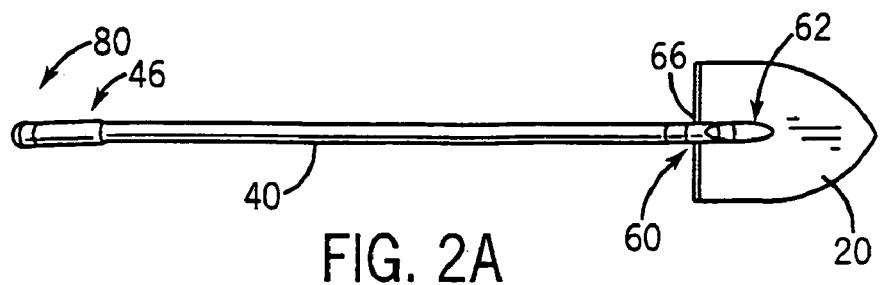
FIGS. 2A through 2C are a schematic representation of another improved hand tool according to a preferred embodiment.
Figure 2B:
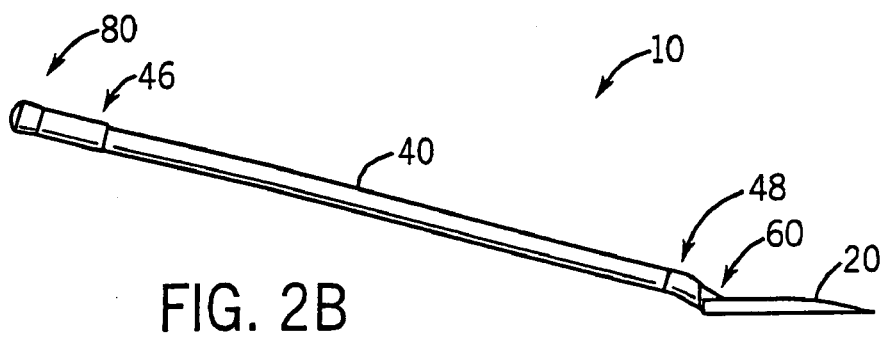
Figure 2C:
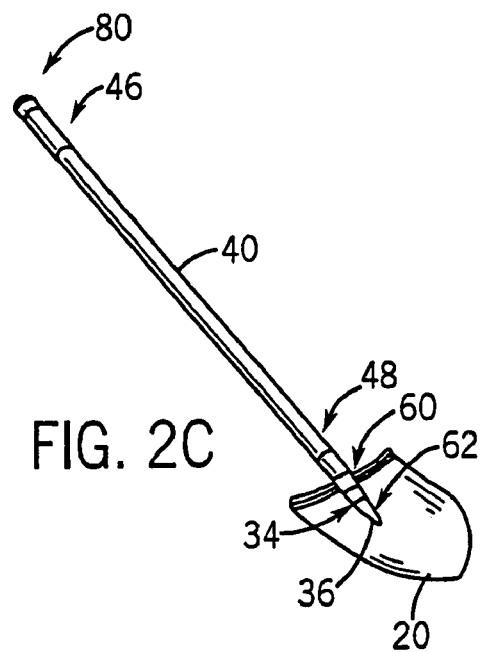
Figure 3A:
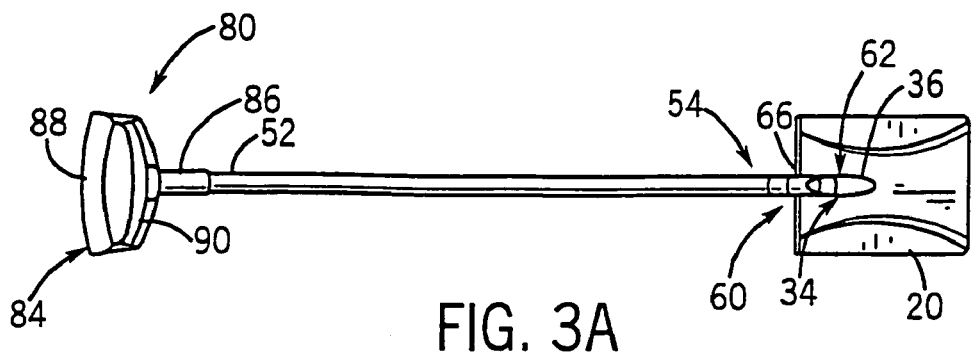
FIGS. 3A through 3C are a schematic representation of another improved hand tool according to a preferred embodiment.
Figure 3B:
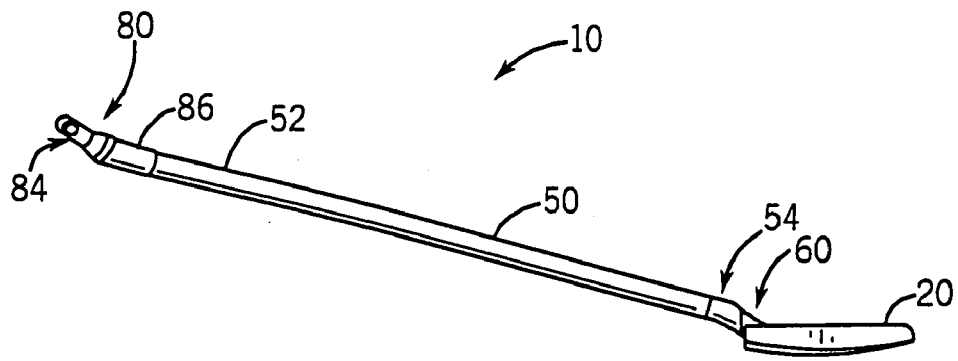
Figure 3C:
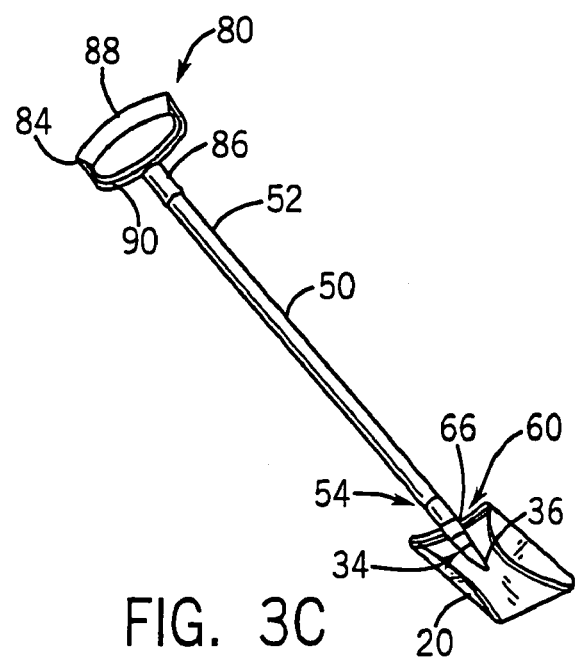
Figure 4A:
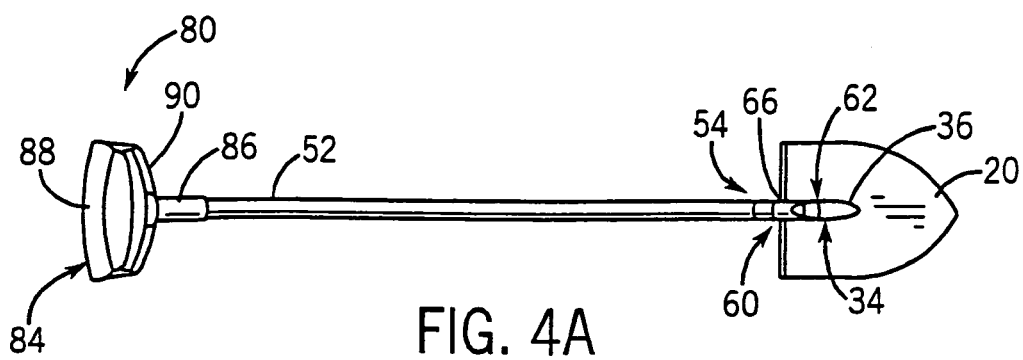
FIGS. 4A through 4C are a schematic representation of another improved hand tool according to a preferred embodiment.
Figure 4B:
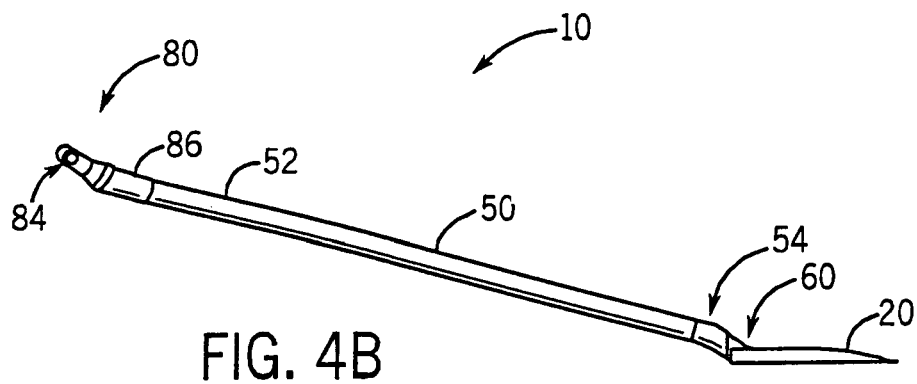
Figure 4C:
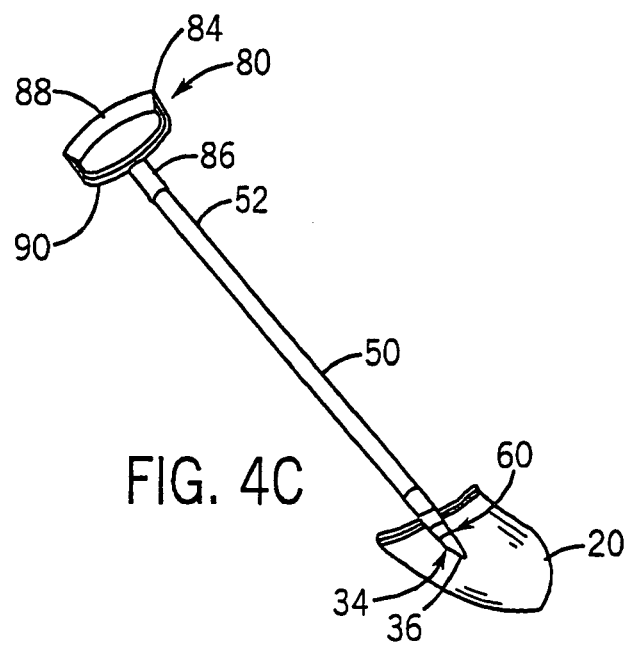
Figure 5A:
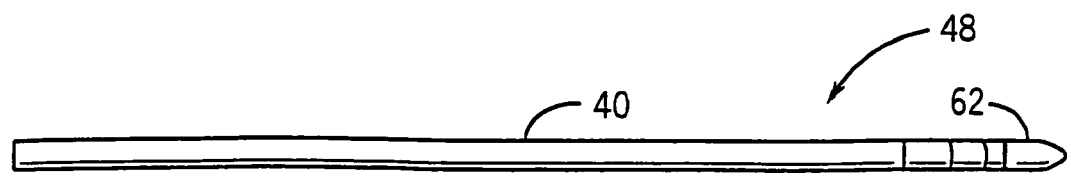
FIGS. 5A through 5C are a schematic representation of a handle extension portion of an improved hand tool according to a preferred embodiment.
Figure 5B:
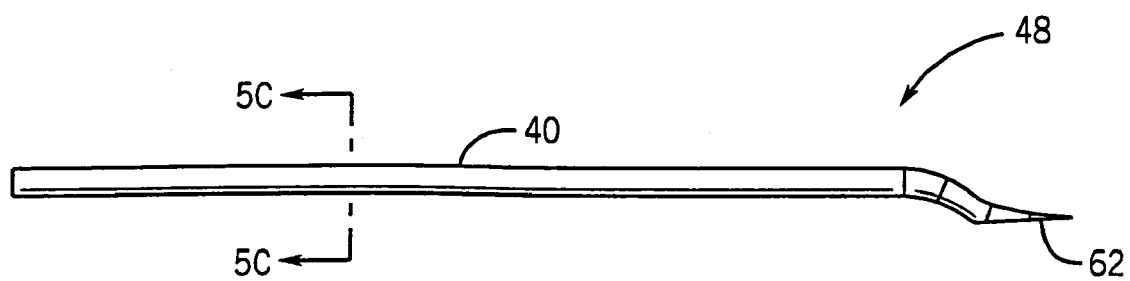
Figure 5C:
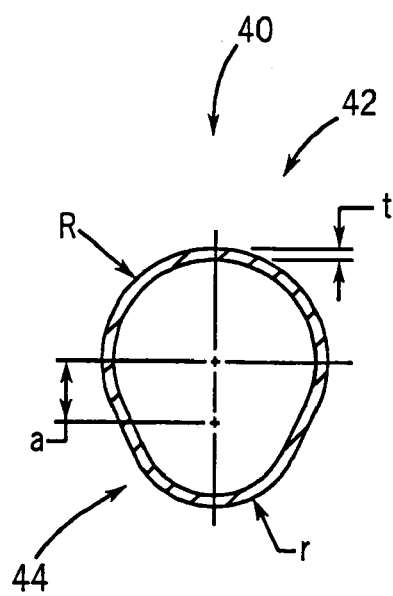
Figure 6A:
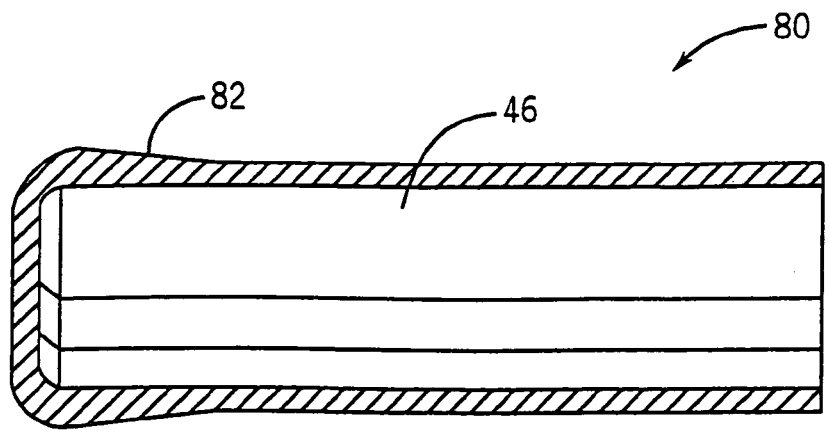
FIGS. 6A through 6D are a schematic representation of a gripping portion of an improved hand tool according to a preferred embodiment.
Figure 6B:
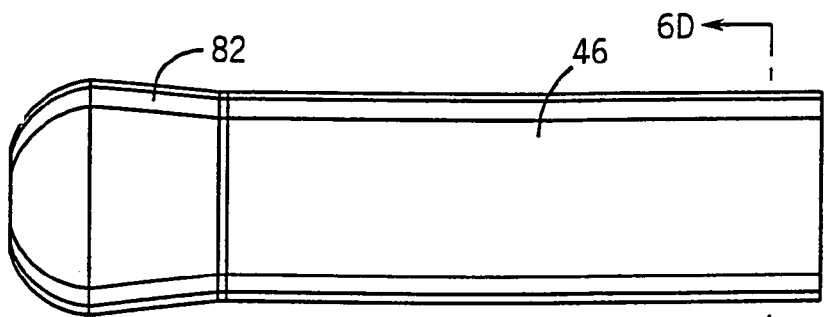
Figure 6C:
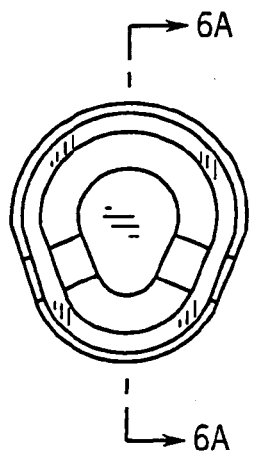
Figure 6D:
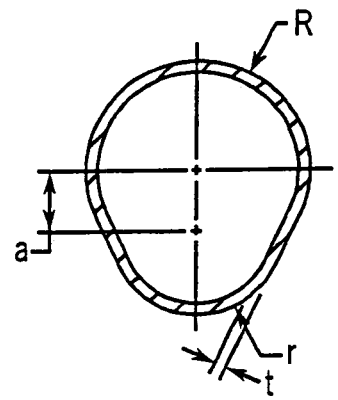

Referring to FIGS. 1A through 1C and 2A through 2C, an improved hand tool 10 is shown according to a preferred embodiment. Hand tool 10 includes a tool head portion 20 (shown schematically as a square point shovel in FIG. 1, and a round point shovel in FIG. 2), a long handle extension portion 40 (shown schematically as an elongated shaft member), a coupling portion 60 (e.g. connection, interface, etc.) and a gripping area 80. According to a particularly preferred embodiment, long handle extension portion 40 is formed having an oblong (e.g. egg-shaped, etc.) cross sectional profile 42 (as shown schematically in FIG. 5C) with a downwardly facing tapered end 44 that is intended to improve the adaptability of the long handle extension portion to a user's hand. The profile in the embodiment shown is formed by two circles with a radius of R and r, respectively, and with a center distance "a," and thickness "t." The ratio a:R is generally in within the range of 0.2-1.2, and preferably within the range of 0.5-0.7, while the ratio r:R is generally within the range of 0.62-0.94, and preferably within the range of 0.65-0.85. The oblong cross sectional profile 42 provides a profile that is comparatively tall and is intended to improve the strength of long handle extension portion 40 in comparison to a conventional handle extension having a round profile with similar radius and material thickness characteristics. The dimensions for R, r and a of the oblong cross sectional profile 42 and the material thickness t may be any suitable dimensions to provide a long handle extension portion having the desired strength and user gripping characteristics intended for a particular hand tool application. According to a particularly preferred embodiment, long handle extension portion 40 is hollow and made of steel and has a generally linear elongate shape, and is provided with any suitable length for a long-handled tool. However, in alternative embodiments, the long handle extension portion may be made of other materials such as metal alloys, wood, aluminum, impact-resistant plastic, polymer, etc. According to further alternative embodiments, the long handle extension portion may be provided in other shapes such as an "offset" or "bent" or "curved" configuration to suit the intended use and application of the hand tool.

Referring to FIGS. 1A through 1C, 2A through 2C and 6A through 6C, the long handle extension portion 40 has an upper end 46 providing a gripping area 80. Gripping area 80 includes a gripping portion 82 (shown schematically as an end cap, sleeve, etc.) according to a preferred embodiment. According to a particularly preferred embodiment, gripping portion 82 is shown having an oblong (e.g. egg-shaped, etc.) cross sectional profile corresponding to profile 42 and a length suitable for one-hand or two-hand gripping by a user and is adapted to fit over the external surface of long handle extension portion 40 at the upper end 46. Gripping portion 82 is preferably made of a durable and resilient material such a polymer or plastic or other suitable material intended to provide an improved gripping surface and cushioning for a user.

Referring to FIGS. 3A through 3C and 4A through 4C, an improved hand tool 10 is shown according to a preferred embodiment. Hand tool 10 includes a tool head member 20 (shown schematically as a square point shovel in FIGS. 3A through 3C, and a round point shovel in FIGS. 4A through 4C), a short handle extension member 50 (shown schematically as an elongated shaft member), a coupling portion 60 (e.g. connection, interface, etc.) and a gripping area 80. According to a particularly preferred embodiment, short handle extension portion 50 is formed having an oblong (e.g. egg-shaped, etc.) cross sectional profile 42 (as shown schematically in FIGS. 5A through 5C) having similar characteristics as previously described for the long handle extension member 40. The short handle extension may be formed having suitable bends, curves or contours to position the tool head for optimum use in an intended application (e.g. shoveling, digging, raking, etc.). According to other embodiments, a portion of the long and/or short handle extension members may have a cushion material along a mid section to improve the grip and comfort level of a user. The cushion material may be applied as a coating or installed as a sleeve, etc.

Figure 7A:
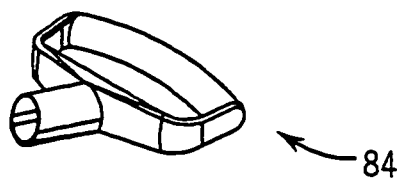
FIG. 7A through 7G are a schematic representation of another gripping portion of an improved hand tool according to a preferred embodiment.
Figure 7B:
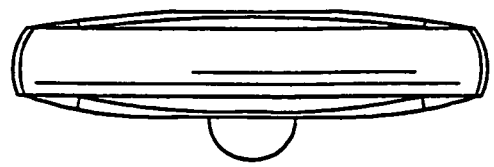
Figure 7C:
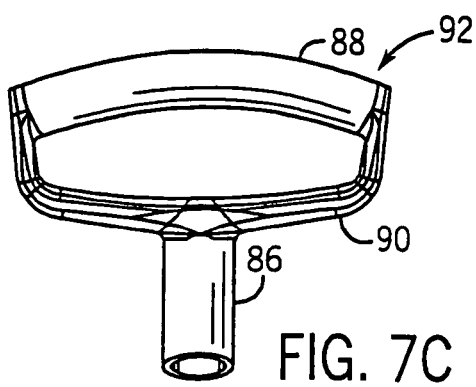
Figure 7D:
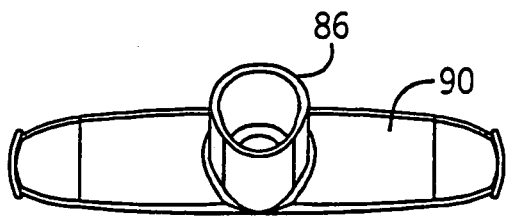
Figure 7E:
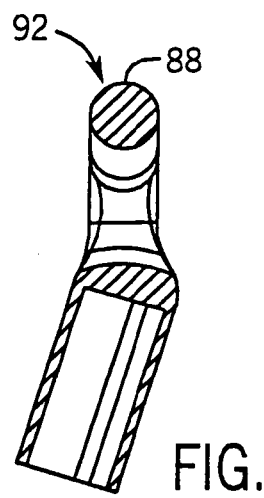
Figure 7F:
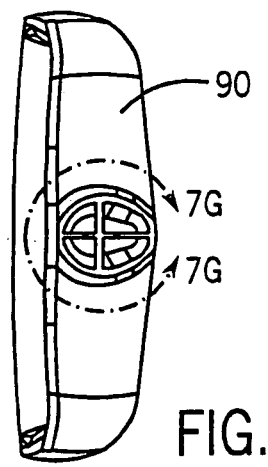
Figure 7G:
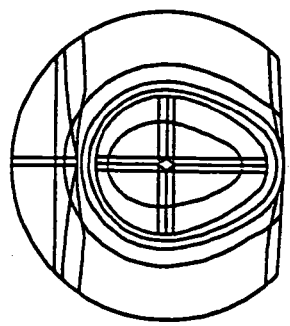
Figure 8:
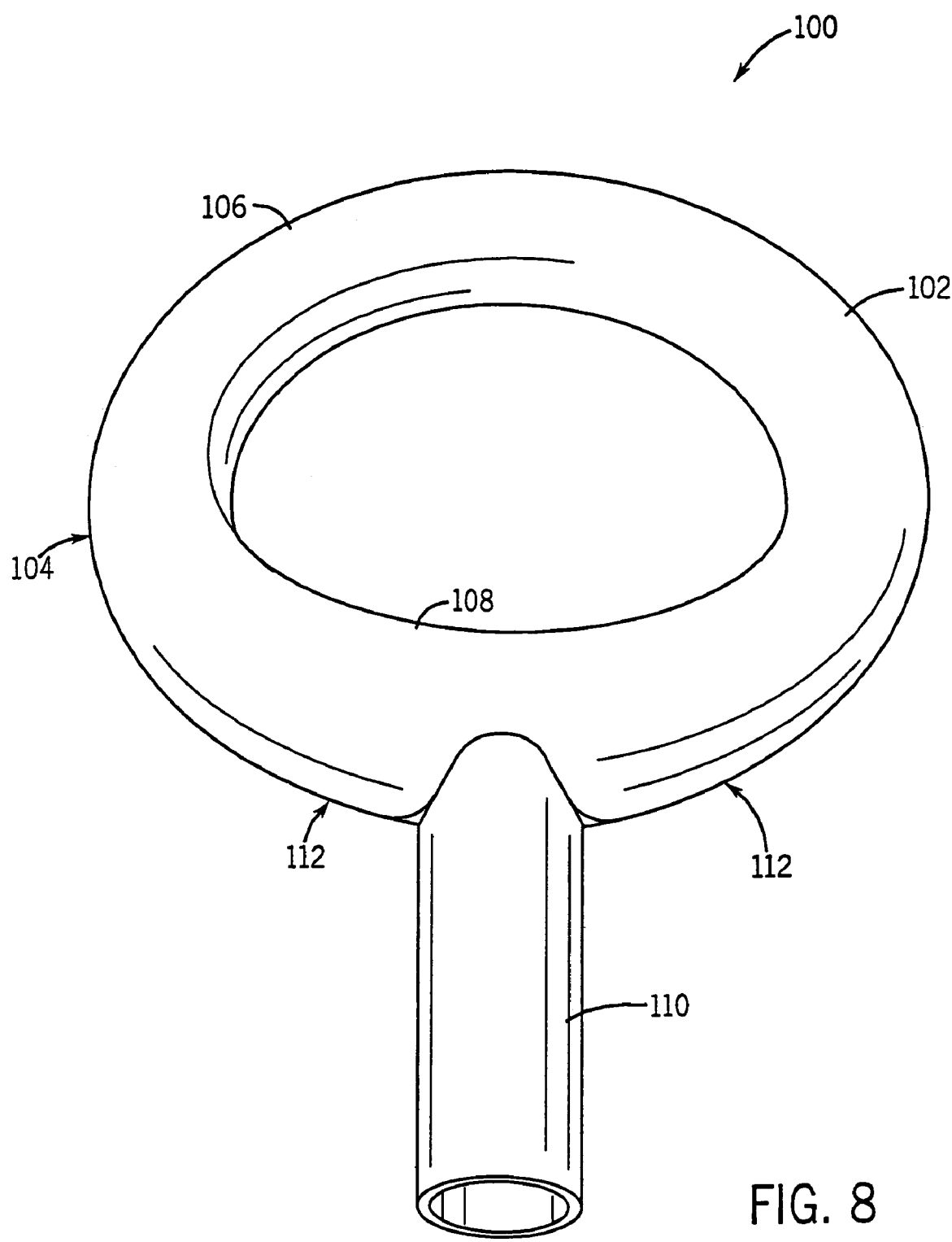
FIG. 8 is a schematic representation of another gripping portion of an improved hand tool according to a preferred embodiment.

Referring to FIGS. 3A through 3C, 4A through 4C and 7A through 7G, the short handle extension portion 50 has an upper end 52 providing a gripping area 80. Gripping area 80 includes a gripping member 84 (shown schematically as an extended or widened arcuate handle) according to a preferred embodiment. Gripping member 84 has an extension 86 that is coupled to upper end 52 of the short handle extension portion 50 in any suitable manner. In a particularly preferred embodiment, gripping member 84 is formed by an upper member 88 having opposite ends and a substantially arcuate shape therebetween, and a lower member 90 generally in the shape of a shallow "U". The "sides" of the "U" are shown having a generally rectangular cross-sectional shape and each extending upward from the lower member 90 at an outward angle of approximately 5 degrees, although other suitable angles may be used. According to a preferred embodiment the "sides" of the "U" are integrally formed with the opposite ends of upper member 88. The cross-sectional shape of the "bottom" of the "U" is shown as generally rectangular with a convex top surface that is intended to provide a lower gripping surface for a user (e.g. when kneeling or otherwise using the tool in a configuration where a "lower" gripping surface is desired). As shown in FIGS. 7D and 7E, a bottom surface of the "bottom" of the "U" is coupled to extension 86 at an angle. According to a preferred embodiment, the lower member 90 and the extension 86 are integrally formed and are positioned with an offset angle of approximately 12 degrees, however other angles may be used to suit a particular application or to provide a desired position for comfort and leverage during use of the hand tool. The cross sectional shape of the upper member 88 is shown as generally circular and the cross sectional shape of the lower member 90 is shown as generally rectangular with rounded corners. Referring to FIG. 7E, lower member 90 and upper member 88 are shown configured at an angle from an axis of handle extension 50 to provide an offset.

The gripping member 84 may be made of metal (e.g. steel, aluminum, etc.) and a material may be applied over the upper member 88 and/or the lower member 90 to provide a gripping surface 92 to improve the grip-ability and cushioning of the gripping portion 84. According to a preferred embodiment, the gripping member is made of a lightweight material such as plastic and formed in a molding or other suitable process as a substantially hollow piece having desired properties such as lightweight, strong, resilient, rustproof, etc. The surface of the gripping member may be smooth to tend to minimize abrasion with the skin of a user's hands, or may be provided with a texture to improve grip-ability of a user. The width of the upper member 88 and the lower member 90 of the gripping portion 84 is substantially wider than conventional tool handles and suited for one-hand or two-hand gripping by one or more users on either, or both of, the upper member 88 and the bottom member 90. According to a preferred embodiment, the gripping member has a width of approximately 8.5 inches, although other widths may be provided to suit a desired application. According to alternative embodiments, the gripping portion may be formed in any suitable shape, such as, but not limited to, circular, triangular, square, rectangular, etc. and may have rounded edges or corners. In further alternative embodiments, the cross sectional shape of the members of the gripping portion may be provided in any suitable shape such as oval, circular, square, hexagonal, octagonal, etc.

Referring to FIGS. 3A through 3C, 4A through 4C and 8, a gripping area 80 with a gripping portion 100 (shown schematically as an elliptical ring in FIG. 8) is shown according to another preferred embodiment. Gripping portion 100 has an extension 110 that is coupled to an upper end 52 of the short handle extension portion 50 in any suitable manner. In a particularly preferred embodiment, gripping portion 100 is formed by a member 102 having an oval or elliptical profile, and the cross sectional shape of member 102 is generally circular with a diameter that increases as member 102 converges toward extension 110 at coupling regions 112. A material is applied over member 102 to provide a gripping surface 104 to improve the grip-ability and cushioning of the gripping portion 100. The elliptical profile of the gripping portion is intended for one-hand or two-hand gripping by a user on either the top portion 106 or the bottom portion 108. The generally circular cross sectional shape of the member 102 further allows one or more users to grip the gripping portion 100 with one or two hands at any convenient location around the perimeter of the gripping portion to improve the availability of user-gripping configurations associated with use of the improved hand tool 10. Member 102 is preferably made of steel or aluminum and gripping surface 104 is preferably made of a durable and resilient material such a polymer, a plastic or other suitable material intended to provide an improved gripping surface and cushioning for a user. According to alternative embodiments, the member may be formed having any suitable profile, such as, but not limited to, oval, circular, triangular, square, rectangular, etc. and may have rounded edges or corners. According to other alternative embodiments, the member may be formed of any suitable material such as metal alloys, plastics, etc. and the cross sectional shape of the member may be provided in any suitable shape such as oval, cylindrical, square, hexagonal, octagonal, etc.

Figure 11A:
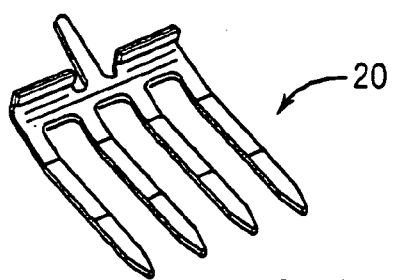
FIGS. 11A through 11G are a schematic representation of another tool head portion of an improved hand tool according to a preferred embodiment.
Figure 11B:
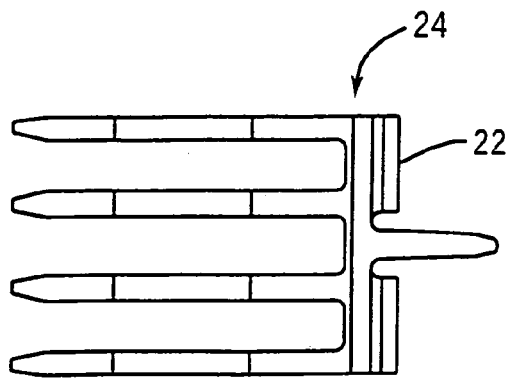
Figure 11C:
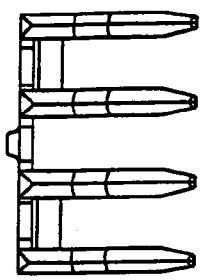
Figure 11D:
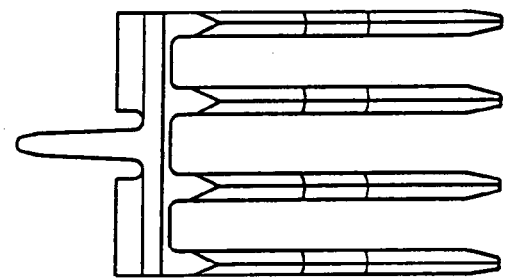
Figure 11E:
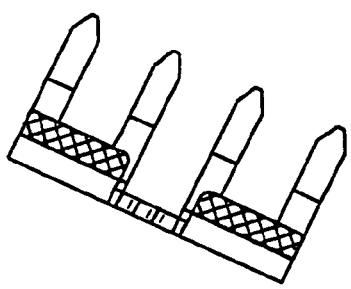
Figure 11F:
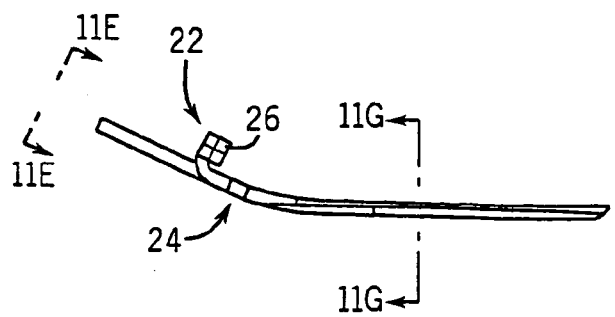
Figure 11G:
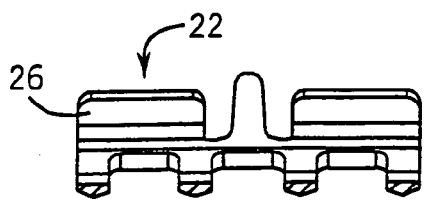
Figure 12A:
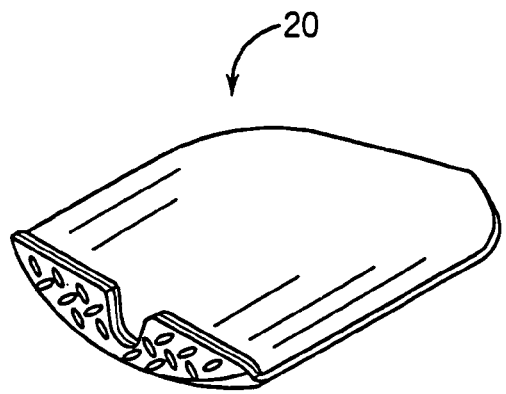
FIGS. 12A through 12E are a schematic representation of another tool head portion of an improved hand tool according to a preferred embodiment.
Figure 12B:
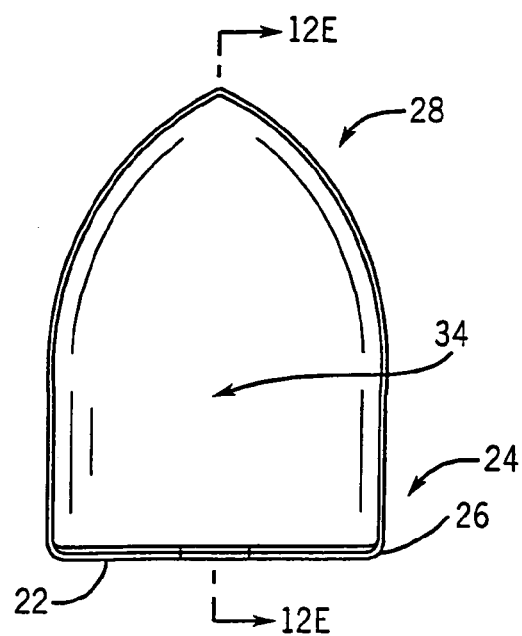
Figure 12C:
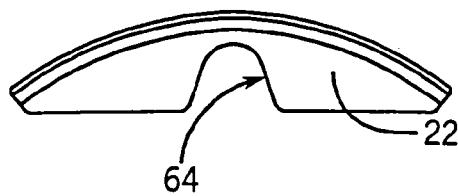

Referring further to FIGS. 1A through 4C, tool head portion 20 is shown according to a preferred embodiment. Tool head portion 20 may be any tool or implement useful in connection with a handle extension portion for performing work by a user. In a particularly preferred embodiment, tool head portion 20 is a square point shovel (as shown schematically in FIGS. 1A, 3A, 9A and 10A), a round point shovel (as shown schematically in FIGS. 2A, 4A and 12A), or a fork (as shown schematically in FIG. 11A). Tool head portion 20 is preferably made of steel and has suitable contours for use in an intended application. According to alternative embodiments, the tool head may be any device or implement adapted for use on a handle extension, such as, but not limited to a snow shovel, a rake, a hoe, a cultivator, a broom, etc.

Referring to FIGS. 9A-12E, a step portion 22 for tool head 20 is shown according to a preferred embodiment. Step portion 22 is provided at an upper end 24 of tool head 20 generally adjacent the lower end of handle extension portion 40 and 50 to provide a ledge or step location on which a user may apply additional force to the tool head 20 such as by stepping or standing on the step portion 22. According to one embodiment, step portion 22 is created by a providing an extension of the material at the upper end 24 of tool head 20 that is formed into a ledge having an increased thickness layer 26 (e.g. double thickness) to provide increased strength and resistance to deformation during use. The step portion 22 is shown oriented generally perpendicular to the upper end 24 of tool head 20 and may be formed in a heating and bending operation to provide two or more folded material thickness layers. Step portion 22 is shown with a surface having a texture 23 (e.g. treads, ridges, nubs, etc.) that are intended to minimize the tendency of a user's foot to slip on step portion 22, particularly during wet or otherwise "slippery" conditions. The treads may be provided by stamping or other suitable forming process and may be provided in a suitable pattern (e.g. crisscross, herringbone, etc.) that is intended minimize slipping or provide improved traction for a user's foot, etc. According to an alternative embodiment, the step portion may be provided by welding an additional layer of material or may be provided by using material having increased thickness at the upper end of the tool head, and using any suitable forming operation.

Figure 10A:
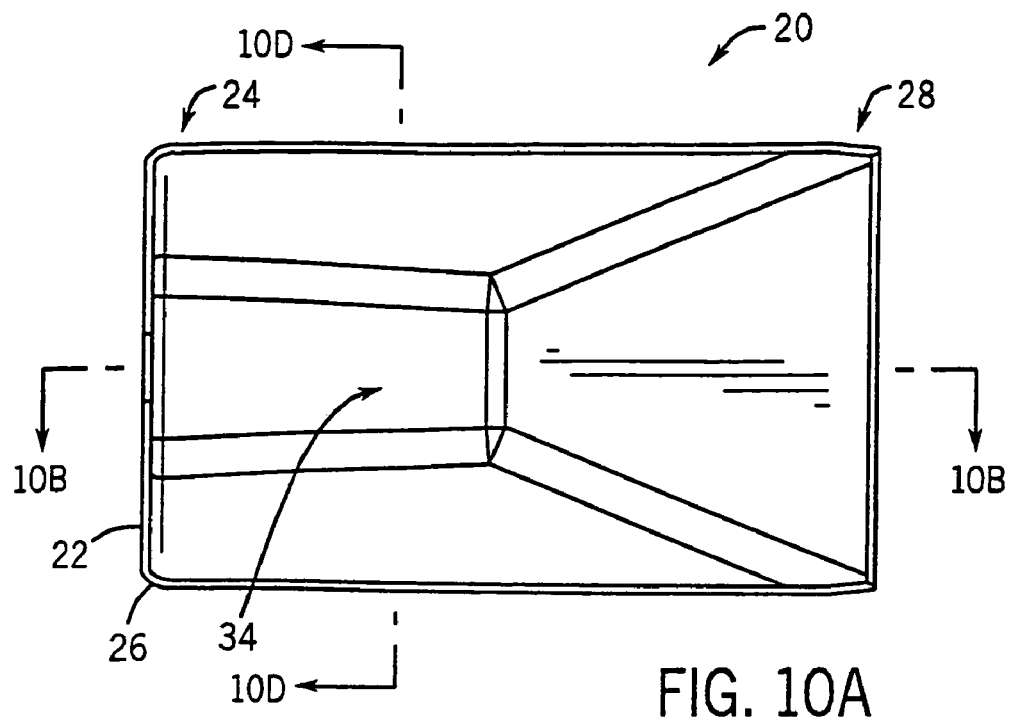
FIGS. 10A through 10D are a schematic representation of another tool head portion of an improved hand tool according to a preferred embodiment.
Figure 10B:
Figure 10C:
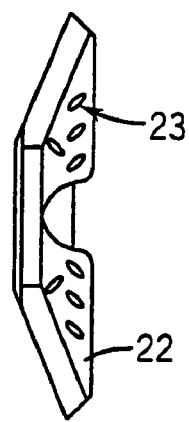
Figure 10D:
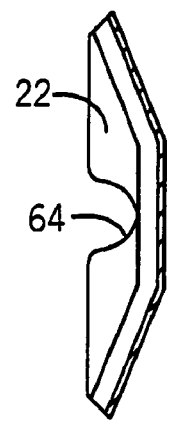
Figure 12D:
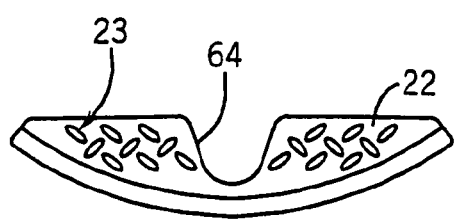
Figure 12E:
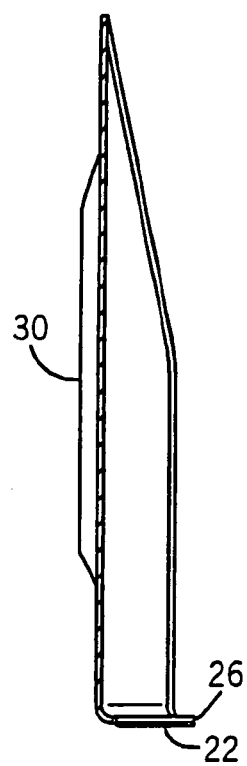

Referring further to FIGS. 9B, 10B and 12D, tool head 20 is shown with a reinforcing portion or section 30 according to a preferred embodiment. Tool heads may be subjected to certain increased loading conditions resulting in deformation or damage during certain operating conditions, such as, for example, when the lower end of the tool head is firmly engaged and leverage is applied on the gripping area or handle extension portion. According to a one embodiment, tool head 20 includes a reinforcing section 30 on a blade member of the tool head 20 that is intended to provide increased strength and improved resistance to damage. Reinforcing section 30 is shown as an area of material in the general shape of a pad or layer having increased thickness extending from a back side of the blade member and contoured to provide a generally smooth and continuous surface. The reinforcing section extends generally from a location near the bottom end 28 of the tool head 20 to a location near the upper end 24 of the blade of the tool head 20 to provide a reinforcing area of increased material thickness. Reinforcing section 30 may be created by providing a blank of material having an area of increased thickness, whereby the blank is formed into the shape of the desired tool head using conventional forming operations. According to an alternative embodiment, the reinforcing section may be a separate material element that is attached to the back side of the blade member by any suitable method such as welding and grinding, etc. According to another alternative embodiment, the reinforcing section may be provided on the front side of the blade member and contoured with the shape of the tool head to provide a generally continuous surface. According to a further alternative embodiment, the reinforcing section may be provided in multiple sections or patterns such as, but not limited to, elongated ribs or strips.

Referring further to FIGS. 1A through 5B the coupling portion 60 of the improved hand tool 10 is shown according to a preferred embodiment. Coupling portion 60 is intended to provide a rigid connection between the tool head 20 and the handle extension member 40 or 50. Coupling portion 60 includes a connection portion 62 on the lower end 48 and 54 of handle extension portion 40 and 50 respectively, and a connection portion 34 on tool head 20. According to a particularly preferred embodiment, connection portions 62 and 34 are adapted for mating contact over at least a portion of their common surfaces and are fixedly coupled by a weld (shown schematically as weld 36). As shown, connection portions 62 and 34 result in a junction at a region of contact between lower ends of the handle extensions and the tool head that forms a shape generally in the form of an elongated "U" that is formed by the angled face along the lower end of the handle extension portion. The weld 36 may be provided substantially along the entire perimeter of the "U" shaped contact area between the lower end of the handle extension and the tool head.

Coupling portion 60 further includes a recess 64 (e.g. opening, notch, cut-out, etc.) in step portion 22. Recess 64 is configured to create an interface between the step portion 22 and a portion of the perimeter of handle extension members 40 and 50 that are positioned at least partially within recess 64. The step portion 22 and the lower end of handle extensions portions 40 and 50 are fixedly coupled by a weld 66 provided along at least a portion of the interface between recess 64 and handle extension members 40 and 50. According to an alternative embodiment, the coupling portion may include a sleeve welded to the upper end of the tool head and to the step portion and adapted to receive a lower end of an extension handle portion (for example, when the handle extension member is a non-weldable material).

According to any preferred embodiment, the improved hand tool provides a structurally robust tool that is adapted for convenient and comfortable use by a user. The improved hand tool may include any one or more of a step portion having increased thickness, a step portion having treads or other anti-slip features, a coupling portion that features a welded perimeter along an interface between the handle extension and tool head, a tool head having an intermediate region provided with increased material thickness, and a gripping member that is ergonomically configured for use with two hands on either an upper member or a lower member. The improved hand tool is intended to be provided as a commercially available product for sale to users in residential, commercial, agricultural, industrial, or other suitable fields of use. The tool head of the improved hand tool may be provided with a leading edge that is pre-sharpened (e.g. shovel blade edge, etc.) for improved performance, and may be marketed with a protective fixture, guard or coating over the pre-sharpened edge to maintain the safety of consumers, users and handlers of the tool.

According to alternative embodiments, the improved hand tool may be any tool or implement adapted for coupling to a handle extension portion for performing a function by a user. Such tools or implements may include shovels having any suitable shape, contour or intended application, rakes, hoes, cultivators, forks, trowels, aerators, etc. In further alternative embodiments, the handle extension portion may have an oblong profile created by any suitable combination of dimensions, radii, thickness or materials.

It is important to note that the construction and arrangement of the elements of the improved hand tool provided herein are illustrative only. Although only a few exemplary embodiments of the present invention have been described in detail in this disclosure, those skilled in the art who review this disclosure will readily appreciate that many modifications are possible in these embodiments (such as variations in features such as tool heads, coupling portion configurations, forming processes or methods, gripping portions sizes and shapes, variations in dimensions and proportions of the components of the improved hand tool, use of materials, colors, combinations of shapes, etc.) without materially departing from the novel teachings and advantages of the invention. Accordingly, all such modifications are intended to be within the scope of the inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. An improved hand tool comprising:
an elongated handle member coupled to a tool head;
a junction between the elongated handle member and a surface of the tool head defining an elongated interface;
a first weld provided at least partially along the elongated interface so that the tool head is rigidly attached to a lower end of the elongated handle member;
a step portion extending from the tool head and having a recess that receives the elongated handle member; and
a second weld between the step portion and the elongated handle member proximate the recess.

2. The improved hand tool of claim 1 wherein the tool head is one of a shovel, a spade, a fork, a rake, a hoe, and a cultivator.

3. The improved hand tool of claim 1 wherein the elongated handle member has an offset configuration.

4. The improved hand tool of claim 1 wherein the step portion includes a plurality of treads formed thereon.

5. The improved hand tool of claim 1 further comprising a gripping member coupled to a upper end of the elongated handle member and having a cross-section that is substantially circular.

6. The improved hand tool of claim 5 wherein a top portion of the gripping member is offset from an axis of the upper end of the elongated handle member.

7. The improved hand tool of claim 1, wherein the first weld defines a substantial U shape on the tool head.

8. The improved hand tool of claim 1 wherein the hand tool is provided as a commercially available product.

9. An improved hand tool having a handle member coupled to a tool head, the improvement comprising:
    a junction between the handle member and a surface of the tool head defining an elongated interface;
    a weld provided at least partially along a perimeter of the elongated interface;
    a step member extending from the tool head and including a recess configured to at least partially receive a lower end of the handle member;
    a weld joining the step member and the lower end of the handle member proximate the recess;
    so that the tool head is rigidly attached to the lower end of the handle member.

10. The improved hand tool of claim 9 wherein the tool head is one of a shovel, a spade, a fork, a rake, a hoe, and a cultivator.

11. The improved hand tool of claim 9 further comprising a gripping member coupled to an upper end of the handle member, wherein the gripping portion includes a top portion having a substantially arcuate profile that is coupled to a bottom portion having a substantially U-shaped profile configured to provide a lower gripping surface.

12. The improved hand tool of claim 9 wherein the tool head includes a blade member formed of a material having a first thickness and the step member has a second thickness greater than the first thickness.

13. The improved hand tool of claim 12 further comprising a plurality of treads formed in a crisscross pattern on the step member.

14. The improved hand tool of claim 9 wherein the tool head includes a step end and a leading end each having a first thickness, and a substantially planar section between the step end and the leading end having a second thickness greater than the first thickness.

15. An improved hand tool having a handle member coupled to a tool head where the tool head includes a blade member and a step member, the improvement comprising:
    a lower end of the handle member having an angled face configured for placement on a face of the blade member to define an interface therebetween;
    the angled face of the handle member secured to the face of the blade member at least partially along the interface;
    the blade member integrally formed with the step member, the step member having a plurality of treads and a recess at least partially surrounding the lower end of the handle member; and
    a weld that couples the step member to the lower end of the handle member at the recess.

16. The improved hand tool of claim 15 wherein the interface between the angled face of handle member and the face of the blade member defines an elongated interface, and wherein a weld is provided at least partially along a perimeter of the elongated interface so that the tool head is rigidly attached to the lower end of the handle member.

17. The improved hand tool of claim 15 further comprising a gripping member disposed at an upper end of the handle member, wherein the gripping member includes a top portion with opposite ends defining an arc therebetween to provide an upper gripping surface and a bottom portion configured to provide a lower gripping surface and coupled to the opposite ends of the top portion and coupled to the handle member.

* * * * *